(No Model.)
W. & I. H. TRABUE.
PLANTING HOE.
No. 365,108. Patented June 21, 1887.
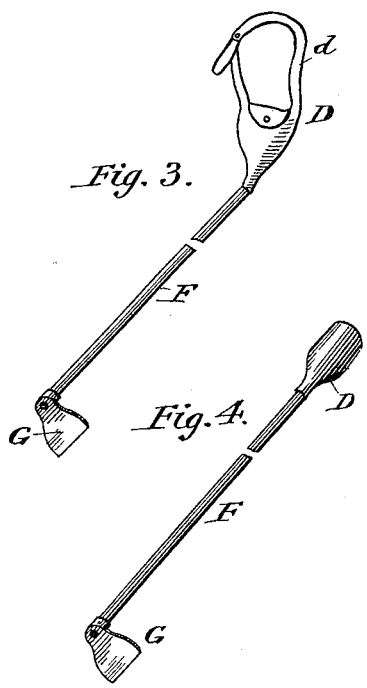
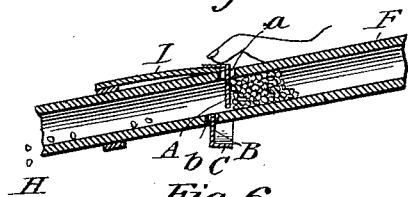
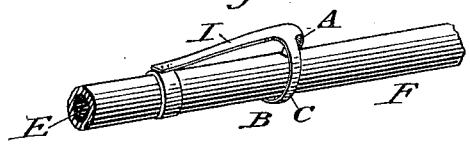
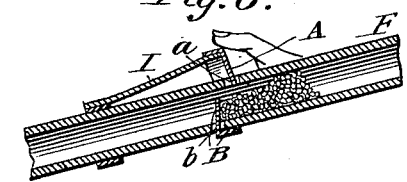
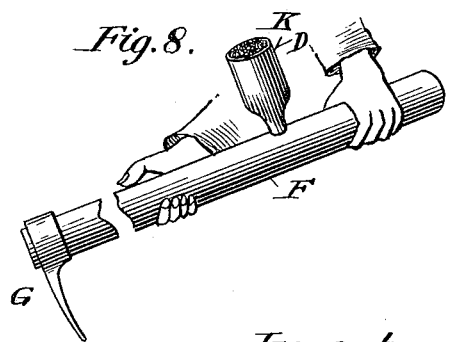
Witnesses.
Norris A. Clark.
Hugh W. Nealy.
Inventors
Wm and I. H. Trabue
per M. L. Halleck
Atty.

UNITED STATES PATENT OFFICE.

WILLIAM TRABUE AND ISAAC H. TRABUE, OF LOUISVILLE, KENTUCKY.

PLANTING-HOE.

SPECIFICATION forming part of Letters Patent No. 365,108, dated June 21, 1887.

Application filed September 10, 1886. Serial No. 213,241. (No model.)

*To all whom it may concern:*

Be it known that we, WILLIAM TRABUE and ISAAC H. TRABUE, citizens of the United States of America, residing at Louisville, in the county of Jefferson and State of Kentucky, have invented certain new and useful Improvements in Hoe-Planters or Seed-Droppers; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a seed or corn planting or dropping apparatus, and is to a great extent a substitute for the primitive way of planting or dropping corn or seed with the hand from a basket.

The invention consists in a hoe with a hollow handle with a bag or funnel-shaped can attached to the end or upper third of the hoe-handle to hold the grain, with any suitable device, trigger, or feed, to be manipulated with the hand, to let the corn or seed pass through the handle or hose when wanted. The bag, vessel, or can is filled with corn or grain, which is fed by gravity from the bag, vessel, or can through the hoe-handle when the trigger is manipulated. The trigger or device worked by hand is for the purpose of cutting off or regulating the supply of grain to be planted or dropped.

Like letters designate like parts.

Figure 1 represents a sectional view of a hoe-handle and hoe; Fig. 2, a perspective showing one manner of using our device; Fig. 3, a perspective showing the hoe and feed-bag attached together; Fig. 4, a perspective showing a modification of the reservoir; Figs. 5 and 6, details in longitudinal section showing the manner of cutting off the grain; Fig. 7, a detail in perspective showing the trigger upon the hoe; and Fig. 8, a modification showing the reservoir attached to the side instead of the end of the hoe.

F represents a hollow handle, having a hoe, G, at one end, and a seed bag or reservoir, D, provided with a shoulder-strap, d, at the other end. The handle F is provided with openings a and b, respectively, upon the upper and lower sides, and one slightly in advance of the other. In these openings are inserted the seed cut-offs A and B, attached to a ring, C, having a spring-arm, I, secured to a ferrule, C', in the hoe-handle. The normal position of the seed cut-offs is that shown in Figs. 6 and 7—that is, the lower one, B, holds the grain in the tube or handle. When the cut-off A is forced into the handle, (see Fig. 5,) the cut-off B is withdrawn, and the grain in front of cut-off A is free to slide down to the opening in the hoe end of the handle.

If desired, the bag D can be dispensed with and the can, Fig. 4, substituted therefor; or the hoe-handle may be provided with an opening in the upper side and the can D inserted, as shown in Fig. 5.

What we claim as new is—

1. The combination of a hoe and hollow hoe-handle having its exit-opening in front of the hoe, and openings a and b, and the seed cut-offs A and B, the ring C, having a spring, I, and means for attaching the spring to the handle, substantially as described.

2. The combination of a hoe and hollow hoe-handle having its exit-opening in front of the hoe, and openings a and b, the seed cut-offs A B, having the ring C, spring I, and attaching device for the spring, and a feeding-reservoir, D, subtantially as described.

3. The combination of a hoe and hollow hoe-handle having its exit-opening in front of the hoe, and openings a and b, the cut-offs A and B, having ring C, spring I, and attaching device for the spring, and a feeding-bag attached to the handle and having a loop for the neck, substantially as described.

In testimony whereof we affix our signatures in presence of two witnesses.

WILLIAM TRABUE.
ISAAC H. TRABUE.

Witnesses:
THOS. L. MARTIN,
B. BRANDENSTEIN.